United States Patent [19]
Pattison

[11] Patent Number: 4,479,660
[45] Date of Patent: Oct. 30, 1984

[54] TWO WHEEL SYNCHRONOUSLY DRIVEN BICYCLE

[76] Inventor: Daniel J. Pattison, 5204 Myer Ct., Rockville, Md. 20853

[21] Appl. No.: 430,046

[22] Filed: Sep. 30, 1982

[51] Int. Cl.³ ............................................. B62M 1/02
[52] U.S. Cl. ..................................... 280/261; 474/134
[58] Field of Search ........... 280/261, 259, 270, 281 R; 474/134

[56] References Cited

U.S. PATENT DOCUMENTS

| 53,209 | 3/1866 | Wilkinson | 280/261 |
| 484,718 | 10/1892 | Isaacs | 273/284 |
| 559,934 | 5/1896 | Cunningham | 280/261 |
| 564,099 | 7/1896 | Pritchett | 280/261 |
| 613,943 | 11/1898 | Schaibly | 280/225 |
| 1,629,308 | 5/1927 | Riley | 280/260 |
| 2,436,619 | 2/1948 | Swindell | 280/208 |
| 3,049,364 | 8/1962 | Clay | 280/211 |
| 3,193,305 | 7/1965 | Hendricks | 280/225 |
| 3,318,614 | 5/1967 | Lee | 280/221 |
| 3,485,508 | 4/1968 | Hudnall | 280/234 |
| 3,717,360 | 2/1973 | Kennedy | 280/231 |
| 3,823,959 | 7/1974 | Winters | 280/234 |

FOREIGN PATENT DOCUMENTS

| 295673 | 8/1928 | United Kingdom | 474/134 |
| 622248 | 4/1949 | United Kingdom | 474/134 |

*Primary Examiner*—John A. Pekar
*Attorney, Agent, or Firm*—Mason, Fenwick & Lawrence

[57] ABSTRACT

A two wheel, synchronously driven bicycle is disclosed as comprising a frame, a rear wheel, a front wheel, a foot powered drive unit for said rear and front wheels, a fork member whereby the front wheel is rotatably mounted on the frame, the foot power drive unit mounted on the frame having first and second sprockets coupled to be rotatably driven by the foot powered unit, the rear wheel having a third sprocket connected thereto, the front wheel having a fourth sprocket connected thereto, first and second endless belts or chains respectively interconnecting the first sprocket and the third sprocket of the rear wheel, and the second sprocket and the fourth sprocket of the front wheel, and a pair of pulleys mounted on a steering post of the fork member for receiving leading and trailing portions of the second belt and for directing the belt from the second sprocket to the fourth sprocket of said front wheel in a manner to permit steering of the front wheel and to avoid interference of the second belt with the frame.

2 Claims, 4 Drawing Figures

TWO WHEEL SYNCHRONOUSLY DRIVEN BICYCLE

BACKGROUND OF THE INVENTION

1. Field of the Invention

This invention relates to bicycles and, in particular, to mechanisms for driving bicycle wheels.

2. Description of the Prior Art

The more conventional velocipedes and bicycles utilize a crank mechanism, adapted to be turned by the legs of a rider, operatively connected to a rear wheel to propel them. The binary drive bicycles and velocipedes known to the prior art have a number of very serious deficiencies that limit their practicability. Ordinarily in a front wheel drive a crank mechanism is mounted above the front fork within reach of the arms of a rider. Some form of driving connection, usually a sprocket chain, connects the crank mechanism with the front wheel of the bicycle.

Binary drive bicycles are described in U.S. Pat. Nos. 3,193,305, and 564,009, and 3,823,959, as comprising a hand crank mechanism mounted adjacent to the neck of the steering column. The crank is attached to a sprocket which drives a chain which in turn drives a sprocket coupled to the front wheel. Therefore, if the rider drives the front wheel with his hands, the rider will not have full control of the steering mechanism or, at best, there will be a great difference of traction on slippery surfaces.

SUMMARY OF THE INVENTION

It is therefore an object of this invention to provide a new and improved two wheel bicycle, whereby each of the front and back wheels is synchronously driven.

It is a further object of this invention to provide a new and improved synchronously driven two wheel bicycle, wherein a single crank unit is employed to drive both of the front and back wheels.

It is a still further object of this invention to provide a new and improved two wheel bicycle wherein a foot powered drive unit is coupled to drive the front wheel in a manner that will not interfere with bicycle steering and in a manner that will maintain tension on the belt used for front wheel drive.

This and other objects of the invention are met in accordance with the teachings of this invention by a two wheel, synchronously driven bicycle comprising a frame, a rear wheel, a front wheel, a foot powered drive unit for both of the front and rear wheels, a fork member including an upwardly disposed steering post as rotatably mounted on the frame and for mounting the front wheel. The foot powered drive unit comprises first and second sprockets respectively coupled by coupling belts or chains to a third sprocket mounted on the rear wheel and a fourth sprocket mounted on the front wheel. A set or block of first and second pulleys is mounted upon the steering post for receiving respectively a leading portion and a trailing portion of the coupling belt in a manner to permit steering of the front wheel and to avoid interference of the belt with the frame.

In a further aspect of this invention, the block pulleys are suspended from the steering post in a manner to permit movement thereof in a direction substantially perpendicular to the frame, thereby permitting rotation of the steering post to steer the front wheel.

In a still further aspect of this invention, there is disclosed a spring biased tensioning device, whereby tension is applied to the drive belt to permit steering of the front wheel without causing undue slack of the drive belt with respect to either the second or fourth sprockets.

DESCRIPTION OF THE DRAWINGS

A detailed description of a preferred embodiment of this invention is hereafter made with specific reference being made to the drawings in which.

PREFERRED EMBODIMENT OF THE INVENTION

Figure 1:
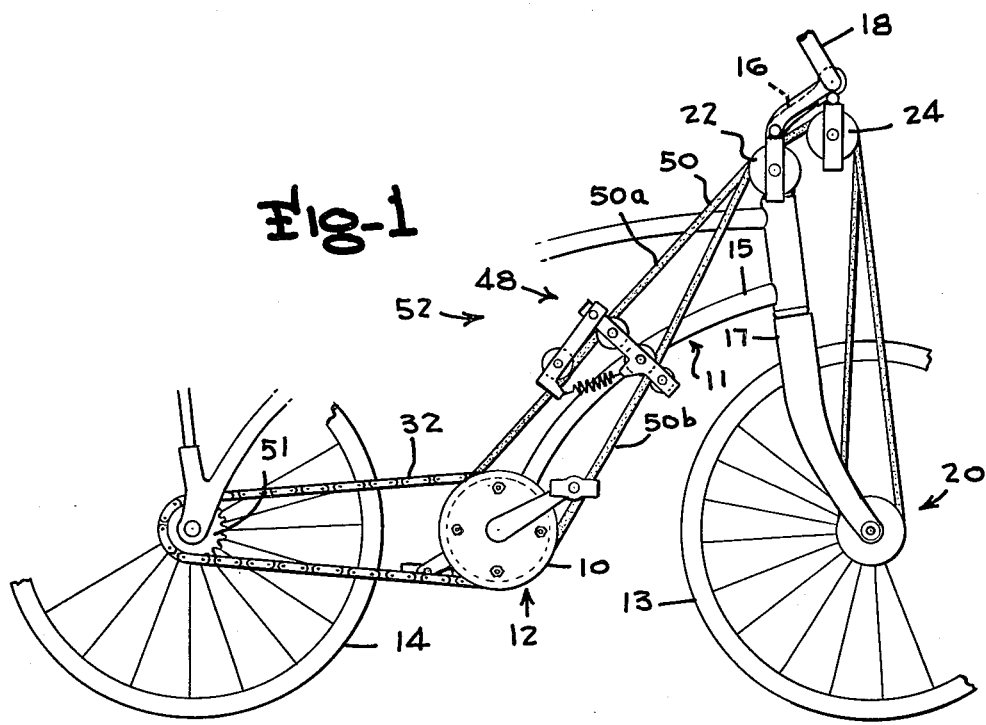
FIG. 1 is a side view of a bicycle incorporating the present invention.

Referring now to the drawings and in particular to FIG. 1, the reference numeral 52 represents a two wheel drive bicycle according to the present invention wherein there is included a front wheel 13, a rear wheel 14, a frame 11 supported at the rear on the rear wheel 14 and supported at its front pivotally free on a steering post 16 that is at the upper end of a fork member 17 supported on the front wheel 13.

The steering post 16 carries steering handle or handlbars 18. The frame 11 carries a seat (not shown). The bicycle 52 also includes a foot powered drive unit 12 for powering or braking the rear wheel 14, and driving in accordance with the teachings of this invention the front wheel 13. The unit 12 includes a rear wheel sprocket 51 and foot pedal sprocket 26 fitted with endless chain 32 within the sprocket 26 coupled to the foot pedals 28.

FIG. 1 shows the entire two-wheel drive system. The front wheel pulley unit 20 shown in FIG. 3 includes a pulley wheel 21 which is the same diameter as the sprocket 51 coupled to the rear wheel 14. Also, the front wheel pulley unit 20 includes a drivable freewheeling hub 34. The pulley wheel 21 is coupled directly to the free-wheeling hub 34 by a continuous drive belt 50. As shown in FIG. 1, a double pulley block 24 is fixed to the underside of the handle bars 18 to the right of the neck of the steering post 16, but not more than 2" from the neck. The pulley block 24 is attached in such a way that it remains parallel and in line with the pulley 21 on the front wheel. The pulley block 24 rotatively mounts first and second pulleys for receiving and guiding a leading portion 50a of the drive belt 50 as being driven toward the front wheel and a trailing position 50b as driven away from the front wheel 13. Behind this pulley block 24, a second double pulley block 22 is attached by a rigid arm, to the handle bars 18. The second pulley block 22, which is free to pivot relative to the handle bars in a direction substantially perpendicular direction to the frame, is to prevent the drive belt 50 from touching the frame 11 of the bicycle during a turn. The second pulley block 22 also includes first and second pulleys for receiving respectively the trailing and leading portions 50a and 50b of the drive belt 50.

Figure 4:
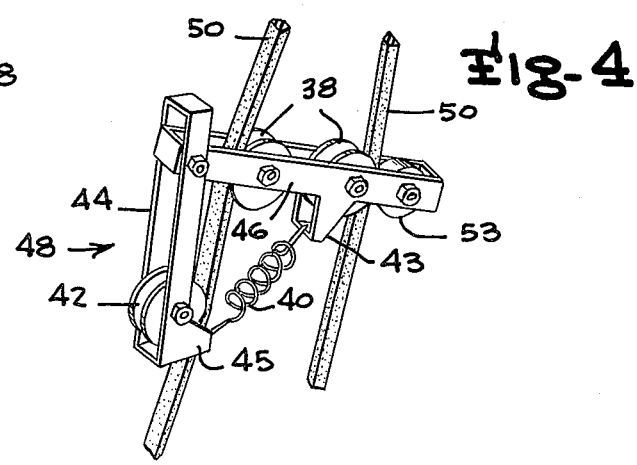
FIG. 4 is a perspective view of a belt tensioning device mounted on the bicycle of this invention to variably apply tension to a belt driving the bicycle's front wheel.

The belt tensioning device 48, as shown in FIG. 4, includes two pulley wheels 38 which ride the inside of the drive belt 50 and a pulley wheel 42 and a roller 53 which rides the outside of the belt 50. The device 48 includes a mounting arm 44 for mounting the outside pulley wheel 42 in a manner that it pivots on a mounting arm 46 for the inside pulley wheels 38 and roller 53. A spring 40 exerts a tensioning force on the two arms 44, 46 pulling them together, thus, tensioning the drive belt 50.

The distance between the two pulleys 38 is equal to the diameter of the large pulley wheel 10, as shown in FIG. 1, which is connected to the sprocket 26 minus two times the diameter of one of the two pulley wheels 38 which are of the same size. The internal pulley mounting arm 44, which is the same size as the external pulley mounting arm 46, is bolted, for example, at the one end to the other pulley mounting arm 46 so that the pulley mounting arms 44 and 46 pivot freely with respect to each other. The spring 40 which is less than an inch long in its unstretched state, is connected at both ends to corresponding notches 45 and 43 of the pulley mounting arms 44 and 46. The spring 40 can only exert a limited pull, e.g. one pound, or else it will effect the steering of the bicycle 52.

Figure 2:
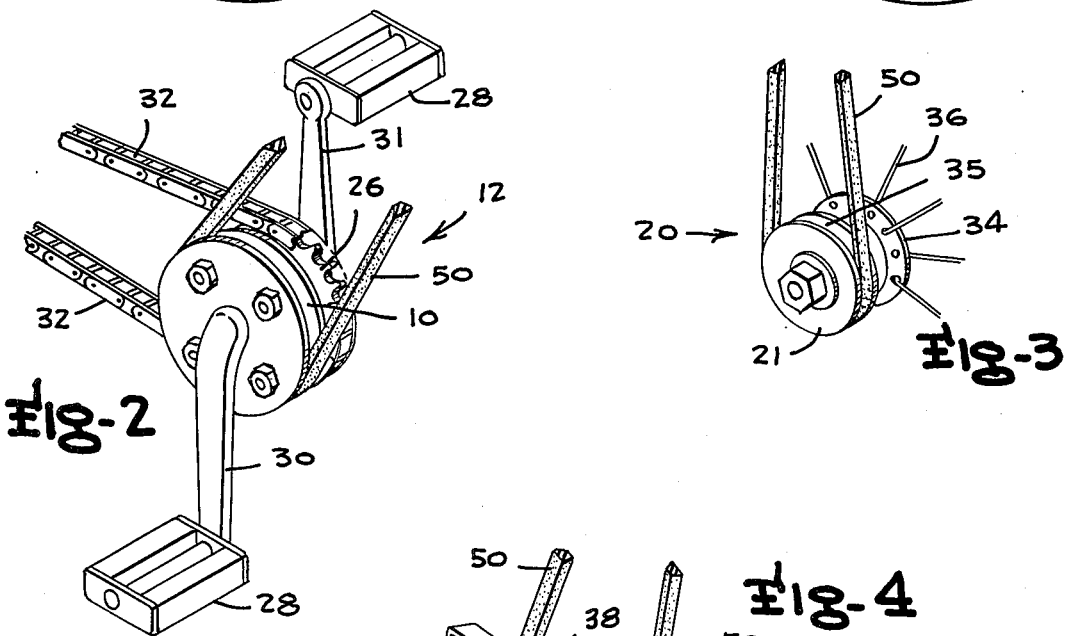
FIG. 2 is a perspective view of a foot powered drive unit.

The foot powered unit 12, as shown in FIG. 2, includes the large pulley wheel 10 which is the same size as sprocket 26, the large sprocket 26, cranks 30 and 31, and pedals 28. The large pulley wheel 10 is bolted through a 3/16 of an inch spacer to the face of the sprocket 26. The spacer between the pulley wheel 10 must be small enough in diameter to not overlap the sprocket teeth. The cranks 30 and 31 are connected to sprocket 26 which is connected to the large pulley wheel 10. The bicycle chain 32 engages the sprocket 26 in a manner well known in the art, and also the sprocket 51 connected to the rear wheel 14. The pedals 28 and cranks 30 and 31 transmit power from the rider's feet to the sprocket 26. The chain 32 transmits power from the sprocket 26 to the rear wheel 14.

Figure 3:
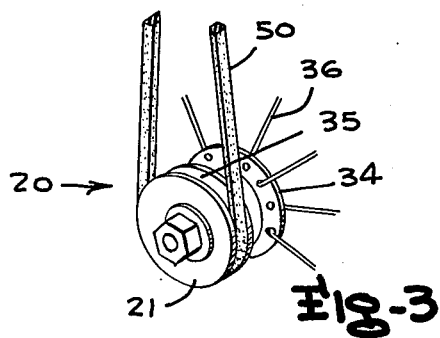
FIG. 3 is a perspective view of the belt-driven pulley wheel coupled to the front wheel.

To drive the front wheel, the flexible rubber belt 50 is fitted into the groove of the large pulley wheel 10. The belt 50 then is threaded through the tensioning device 48, as shown in FIG. 4, the double pulley blocks 22 and 24 which are attached to the handle bars 18, and fed down to the pulley wheel 21 which as shown in FIG. 3 is coupled to the hub 34 of the front wheel 13, where the belt 50 is fitted into the grove of the pulley wheel 21. All the groves of the pulley wheels are the same size as the belt 50 so that the belt 50 fits directly into the grooves. The length of the belt 50 is sufficient to allow the steering column 16 to be turned 35° to the left (and right). Also the belt 50 has to be fed through the system such that the sprocket 10 and the pulley 20 attached to the front wheel 13 both turn in a clockwise direction when driven.

In considering this invention, it should be remembered that the present disclosure is illustrative only and the scope of the invention should be determined by the appended claims.

I claim:

1. A two wheel, synchronously driven bicycle comprising a frame, a rear wheel, foot powered drive means for said rear and front wheels, a fork member whereby said front wheel is rotatably mounted on said frame, said fork member provided with an upwardly disposed steering post, said frame rotatably receiving said steering post to permit steering of said front wheel, said foot powered drive means mounted on said frame having first and second sprocket means, both of said first and second sprocket means being coupled to be rotatably driven by said foot powered drive means, said rear wheel having a third sprocket means connected thereto, said front wheel having a fourth sprocket means connected thereto, first and second endless coupling means respectively interconnecting said first sprocket means and said third sprocket means of said rear wheel and said second sprocket means and said fourth sprocket means of said front wheel, and mounting means on said steering post for receiving leading and trailing portions of said second coupling means for directing said second coupling means from said second sprocket means to said fourth sprocket means of said front wheel in a manner to permit steering of said front wheel and to avoid interference of said second coupling means with said frame, said mounting means comprising first and second pulleys mounted adjacent each other on a common axis, said first and second pulleys for receiving respectively said leading and trailing portions of said second coupling means and means for suspending said first and second pulleys from said steering post to permit movement thereof in a direction substantially perpendicular with respect to said frame, thereby permitting rotation of said steering post and steering of said front wheel.

2. A two wheel, synchronously driven bicycle comprising a frame, a rear wheel, foot powered drive means for said rear and front wheels, a fork member whereby said front wheel is rotatably mounted on said frame, said fork member provided with an upwardly disposed steering post, said frame rotatably receiving said steering post to permit steering of said front wheel, said foot powered drive means mounted on said frame having first and second sprocket means, both of said first and second sprocket means being coupled to be rotatably driven by said foot powered drive means, said rear wheel having a third sprocket means connected thereto, said front wheel having a fourth sprocket means connected thereto, first and second endless coupling means respectively interconnecting said first sprocket means and said third sprocket means of said rear wheel and said second sprocket means and said fourth sprocket means of said front wheel, mounting means on said steering post for receiving leading and trailing portions of said second coupling means for directing said second coupling means from said second sprocket means to said fourth sprocket means of said front wheel in a manner to permit steering of said front wheel and to avoid interference of said second coupling means with said frame, and tensioning means for exerting a tension upon said leading and trailing portions of said second coupling means to take up any slack that develops in said second coupling means as said front wheel is steered, said tensioning means comprises first and second arms pivotably disposed with respect to each other, spring means coupled at each end thereof respectively to each of said first and second arms, said first arm mounting a first pulley for receiving said trailing portion of said second coupling means, said second arm mounts a second pulley for receiving said trailing portion of said second coupling means, and third and fourth pulleys for receiving therebetween said leading portion of said second coupling means.

* * * * *